C. T. HANNA.

Wheat Steamer and Drier.

No. 9,367. Reissued Aug. 31, 1880.

WITNESSES:

W. W. Hollingsworth

Amos W. Hart

INVENTOR:

C. T. Hanna

BY

ATTORNEYS.

UNITED STATES PATENT OFFICE.

CYRUS T. HANNA, OF PITTSBURG, PENNSYLVANIA.

WHEAT STEAMER AND DRIER.

SPECIFICATION forming part of Reissued Letters Patent No. 9,367, dated August 31, 1880.

Original No. 107,680, dated September 27, 1870. Application for reissue filed April 22, 1879.

*To all whom it may concern:*

Be it known that I, CYRUS T. HANNA, of Pittsburg, Allegheny county, Pennsylvania, formerly of Keokuk, Iowa, have invented a new and useful Improvement in Processes and Apparatus for Preparing Grain for Grinding, which is substantially as set forth hereinafter, referring to the accompanying drawings, in which—

Figure 1:
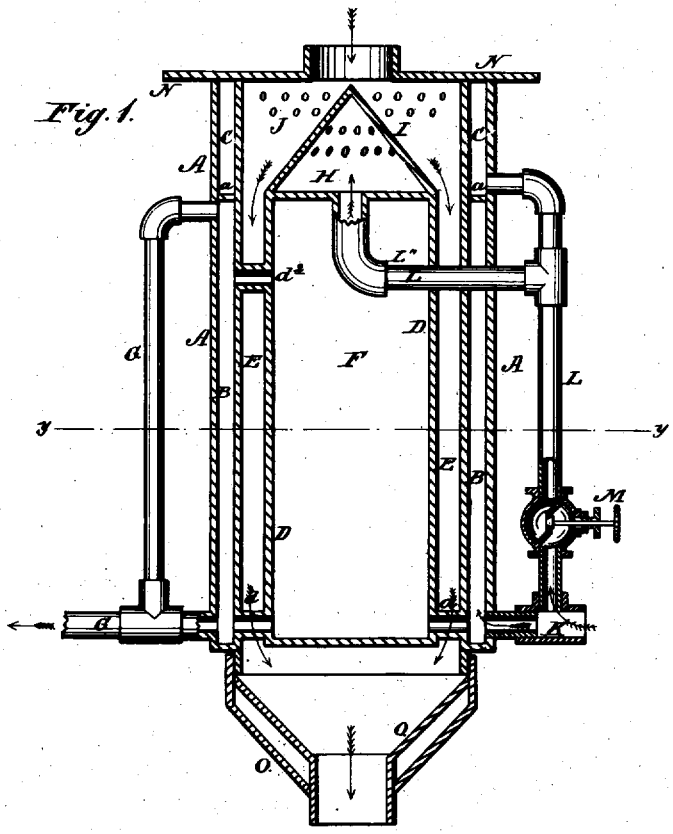
Figure 2:
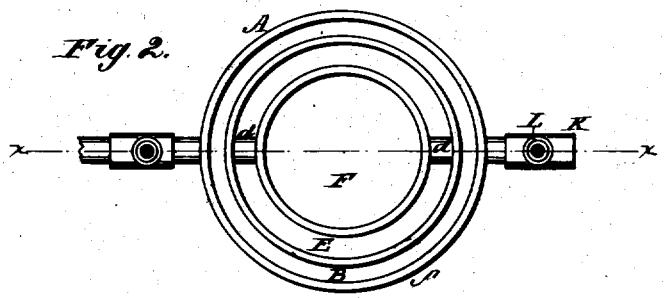

Figure 1 is a vertical section of the apparatus on line *x x*, Fig. 2. Fig. 2 is a horizontal section of the same on line *y y*, Fig. 1.

My invention relates to a process and apparatus for steaming and heating grain and feeding it to the grinding-stones hot, so that it may be ground while hot, to the end that the hull or bran may be easily removed and a better article of flour produced.

The grain is passed in a continuous stream from a bin or chamber through a tubular channel to the burrs for grinding, or in some like way. In this passage it is conveyed into contact with heating-walls in a stream or sheet so thin as to be heated and dried throughout its mass nearly uniformly. It is carried down by its weight so as to be evenly acted on by the heat. Before it passes onto the heated walls steam is passed through the grain to moisten as well as warm it.

The quantity of steam as well as of heat is regulated in each case according to the kind and condition of grain, so as to dry that already too moist, to moisten that too dry, to dry the skin so as to separate readily, and to put the grain in best condition for grinding. This is done in each case with such degree of judgment as experience can best show, giving more or less of steam and less or more of heat to the walls, for this or other desired result.

The apparatus shown is hung upright, so as to form part of the grain-passage. It has an interior part, F, cylindrical in form. This has a conical top, H, which divides the grain evenly and passes it uniformly down the annular space E, around it on all sides. The walls B around this space E are inclosed by outer walls, inclosing a space between, closed at the ends to form a jacket. The interior part, F, is hollow also, and has a cross-wall near the top, separating into two parts. The outer chamber is also divided by cross-walls into two compartments.

Steam is admitted by pipes K L into chambers B and F, and heats them, and passes off by pipe G. This heats the grain in the thin sheet passing between and dries it.

Steam passes by pipe L, having regulating-valve M and two branches, into chambers H C. These chambers have their grain-walls I J perforated with fine holes, which allow the steam to pass through into the grain to any degree desired to moisten it.

The grain being hot when it leaves the funnel O, it is fed hot to the grinding-stones.

I claim—

1. In an apparatus for preparing grain for grinding, the combination of a steam-chamber and steam-conducting pipe provided with a valve, and a separate chamber located below the former for receiving steam or other heating medium, and a conducting-pipe connected therewith and provided with a valve, as shown and described, whereby the amount of steam discharged and degree of heat radiated are made separately regulable, for the purpose set forth.

2. The body of the steamer and heater, provided at its respective upper and lower ends with the steam-discharging cone and the funnel O, whose sides have the same, or nearly the same, superficial area, and are inclined at the same, or nearly the same, angle to a vertical plane, as shown and described, whereby the grain is caused to disperse or spread out in a thin sheet while being steamed, and then to converge or collect, as specified.

3. The combination of two steam-chambers, B F, with an intermediate chamber, E, through which the grain flows, as and for the purpose described.

4. The combination of a series of pipes, K L G $d'$ $d^2$ $d^3$, with the steam-chambers B F H C, for the purpose of introducing, circulating, and removing the steam and carrying off the condensed steam, substantially as herein shown and described.

5. The combination, with a grain-steaming apparatus, of the funnel-shaped double-walled chamber O, placed thereunder, as and for the purpose specified.

6. The combination of the steam-chambers

H and C, having perforated walls, and the steam-chambers F and B, having imperforate walls, to form the steaming-chamber J and drying-chamber E, substantially as shown and described, for the purpose specified.

7. The process of treating and feeding grain for grinding, which consists in moistening it by means of steam and immediately subjecting it to the action of dry heat to expel the surplus moisture, and then at once feeding it while still hot to the grinding-stones, as hereinbefore set forth.

CYRUS T. HANNA.

Witnesses:
W. I. MILLER,
A. J. SPEDDEN.